United States Patent

[11] 3,617,531

| [72] | Inventors | Raymond C. Schlicht<br>Fishkill;<br>Frederic C. McCoy, Beacon, both of N.Y. |
|---|---|---|
| [21] | Appl. No. | 59,345 |
| [22] | Filed | July 29, 1970 |
| [45] | Patented | Nov. 2, 1971 |
| [73] | Assignee | Texaco Inc.<br>New York, N.Y. |

[54] SELECTIVE ADSORPTION OF PHENOLS FROM SOLUTION IN HYDROCARBONS
8 Claims, No Drawings

[52] U.S. Cl. ................................................. 208/263,
208/263
[51] Int. Cl. ...................................................... C10g 17/00
[50] Field of Search ........................................ 208/263,
299, 307; 260/2.5 AX; 210/40

[56] References Cited
UNITED STATES PATENTS

| 3,334,042 | 8/1967 | Teltsma .................. | 208/187 |
| 3,426,902 | 2/1969 | Kilpert et al. ............ | 210/179 |
| 3,487,927 | 1/1970 | Yahnke .................... | 210/30 |
| 3,162,609 | 12/1964 | Eichhorn .................. | 260/2.5 |
| 2,605,212 | 7/1952 | Lobban .................... | 208/263 |

*Primary Examiner* — Delbert E. Gantz
*Assistant Examiner* — J. Nelson
*Attorneys* — Thomas H. Whaley, Carl G. Reis and L. H. Phelps, Jr

ABSTRACT: Extraction of phenolic materials from hydrocarbon solutions by means of polyurethane foam.

SELECTIVE ADSORPTION OF PHENOLS FROM SOLUTION IN HYDROCARBONS

The present invention has to do with the separation, removal or adsorption of phenolic materials from solutions in hydrocarbon liquids.

One significant and therefore troublesome pollutant which finds its way into hydrocarbon or petroleum streams is phenol or various phenolic materials. Phenolic materials also tend to appear in various streams in the chemical industry. In the petroleum refinery there are a number of streams which, during their production and treatment, have been subjected to conditions which have resulted in the development of usually small but sometimes objectionable quantities of phenolic material.

Thus petroleum refinery distillates may contain an appreciable content of phenolics. Such, for example, may be fluid catalytic cracked heavy gasolines, light thermal gas oil and thermal gasoline. It is ordinarily not desirable to pass these impurities or pollutants on into succeeding processes or products and in any event, phenol, cresols and other phenolic materials are valuable chemicals and it is desirable to recover them from solutions in which they occur if this can be accomplished economically. Thus, they are sometimes removed by extraction with aqueous alkaline solutions. It has also been proposed that they be removed with ion exchange resins, or other solid adsorbents.

The various adsorbents for removing phenolic materials from hydrocarbons raise characteristic objections, including high cost, difficulty of use, problems of degeneration in service, lack of sufficient adsorbent capacity, unacceptable regeneration properties, and many other difficulties.

In accordance with the present invention it has been found that effective separation of phenolic material from hydrocarbons can be realized by adsorption upon polyurethane foam.

The adsorption takes place readily, and regeneration is simple and complete. The adsorbent is relatively cheap since it is currently made in multimillion pound quantities for many other uses. Its high surface availability makes it relatively inexpensive to use and readily adaptable to operations which are designed to effect the necessary contact. Also, it is quite readily regenerated and may be recycled thru successive adsorption and regeneration steps for an indefinite number of times.

Also, it is relatively selective for the adsorption of phenols to the exclusion of other chemical materials, and particularly the hydrocarbon solvents.

It is for this reason also that the invention has application to a wide range of nonaqueous solvents which have been contaminated with phenolic materials.

Specifically, the invention has broad applicability to removal of phenolic materials from all hydrocarbons whether of the aliphatic, aromatic or naphthenic classes, for example. Specifically, we can illustrate by means of solvents such as toluene, heptane, and methylcyclohexane as well as such refinery streams as fluid catalytic cracked heavy gasoline, thermal gasoline and light thermal cracked gas oil, mentioned above.

By the term phenolic material as used herein, is meant hydroxyaromatic compounds such as the benzene-based compounds like phenol, chlorophenols, nitrophenols, aminophenols, the cresols, and the xylenols, as well as the naphthalene-based compounds such as the naphthols. It also includes the polyhydroxy materials such as catechol, resorcinol, hydroquinone and 1,2-didydroxynaphthalene, for example.

In reference to the adsorbent material, the invention has broad application to all polyurethane foams, whether the flexible type of foam or the relatively rigid foams.

It has, however, been found preferable to operate with the so-called "reticulate" type of foam, by which term is meant to include such foams as have interstices so interconnected as to form more or less continuous passages thru the foam. This is to be distinguished from the "nonreticulate" form on which the polyurethane has been expanded by a series of internal bubbles which are not necessarily interconnected and which, therefore, do not provide effective internal access by liquids or other fluids which are brought into contact therewith.

In order to yet further promote and facilitate surface contact between the solvent and adsorbent, the latter is subdivided or shredded, which may be readily effected by means of a Waring blender or similar device, capable of shredding or chopping the foam. It is preferred, in the case of the flexible foams, to effect the grinding action in the presence of ice and water so that the chunks of foam tend to be kept in a more rigid condition at the temperature level maintained by the chopped ice and water in the blender. Thus the particles of foam are preferably reduced to about 10 mesh in size.

From the chemical standpoint the polyurethane foam may be of either the so-called ester or ether type. To avoid extensive dissertation on the chemical nature of these products, reference is made to the Interscience Volume VI on Polyurethanes; Chemistry & Technology, Part I, by Saunders-Frisch (pages 32 thru 48) which is included herein by reference.

As to the adsorbent capacity of the polyurethane, it has been found readily possible under favorable conditions to adsorb quantities of phenol which equal or closely approximate the weight of the foam itself. This is in contrast to many other adsorbents which are much less effective on a weight basis. Considering the relatively higher costs of many of the other known polymeric adsorbents, this therefore results in a substantial economic advantage.

As previously intimated, regeneration of the preferred polyurethane adsorbent is greatly facilitated by the fact that it may be conducted with various low-boiling solvents and particularly that it is quickly and readily effected by means of acetone. Since acetone is a solvent for many polymeric materials it is quite surprising that it can be used to regenerate polyurethane foam, which is not apparently injured thereby and can be quickly and readily cycled thru adsorption and regeneration for an indefinite number of times. Therefore, the present adsorbent is not only cheaper to use but is much simpler to regenerate than for example, the ion exchange resins which have been proposed for this purpose.

The characteristics of the adsorption in respect to temperature in general, are essentially a straight line function in which adsorption appears to be facilitated by somewhat lower temperatures.

In general, it is contemplated conducting such operations at temperatures, in the range of say $-20°$ to $100°$ C. Since, however, the lower portions of this range are somewhat more effective, it is usually convenient and preferable to conduct adsorption at temperatures in the range of $0°$ to $40°$ C. or preferably $20°-30°$ C.

The specificity or selectivity of the present adsorbent for phenolic material is illustrated by the fact that a series of tests conducted with typical nonphenolic materials which are commonly met with in streams containing the latter, failed to show any comparable adsorption affinity. Among the compounds tested were naphthenic acids, quinoline, acetic acid, piperazine, cyclohexanol, ethylbutyric acid and n-hexanol.

Two test procedures were used to evaluate adsorbent properties. One was a batch contacting method in which 3 g. of adsorbent were shaken in a flask with 75 cc. solution at ambient temperature. Infrared absorption at 6.25 $\mu$ on the supernatant liquid was compared with that of the original solution to estimate percentage removal of phenolics. Pertinent data are shown in table A.

TABLE A

| Adsorbent* | Phenolic component | Solvent | Reduction in phenolics, percent |
|---|---|---|---|
| PUF (ether type): | | | |
| (3.1% N) | Phenol | Heptane | 85 |
| (5.6% N) | do | do | 60 |
| (5.1% N) | do | do | 65 |
| (5.6% N) | Mixed cresols | do | 60 |
| (6.8% N) | Phenol | do | 50 |
| Activated veg. carbon | do | do | 45 |
| Attapulgite clay | do | do | None |
| Porocel alumina | do | do | None |

*PUF=Polyurethane foam.

All of the polyurethane foams were effective in removing phenolics from heptane, in comparison to three commercially used adsorbent materials. The foams with the lower nitrogen contents appear to be the most effective.

In order to exemplify the invention in a more typical situation where the phenolic material is removed from solution by passing it thru masses or columns of adsorbent, a second standard test was developed wherein a column was packed with adsorbent and subjected to a downflow of the solution of phenolic material.

More specifically, the column was a glass tube having a 5 centimeter inside diameter and a length of about 70 centimeters. 60 grams of the adsorbent material were loaded into the column (except for certain examples as indicated later on, where the amount of adsorbent was increased in order to make reasonable comparison with materials of considerably higher bulk density than polyurethane foam). In these examples the adsorbent polyurethane foam was first, as previously indicated, shredded to the indicated particle size of 10 mesh and placed in the column. The solution of 2.85 weight percent of phenol in normal heptane was fed into the upper end of the column at the indicated rate. Samples were regularly taken at the lower extremity of the tube and tested for phenolic material. The amount of solution fed to the column was limited only by appearance of a "break through."

In other words, the solvent passing thru the column was collected continuously, for all practical purposes, substantially free of phenolic material. In each case, however, there ultimately resulted a condition of adsorbent saturation where there is a more or less rapid increase in phenolic materials in the collected samples. This point was reported as the "break through" and was expressed as the volume in cc.'s of the solvent collected at the break thru point. This, therefore, represents the point at which the adsorbent is no longer highly effective in removing the phenolic material from the solution.

This procedure gives a comparative indication of the prospective properties of the adsorbent from the standpoint of the relative quantity of solvent that it is capable of clearing up and purifying.

In the following table B some comparative results of these exemplary operations are shown, again indicating the improved and relatively substantial quantities of phenolic solutions which are adsorbed by polyurethane foams.

TABLE B

| Solution | Adsorbent* | Rate, cc./min. | Volume at break-thru, cc. | Phenolic adsorbed Total, g. | Phenolic adsorbed Per g. adsorbent |
|---|---|---|---|---|---|
| n-Heptane and 2.85 wgt. percent phenol | 60 g. Nopco polyurethane (ether type) | 5 | 2,600 | 52 | 0.86 |
| Do | Same as above after 3rd acetone regeneration | 10 | 2,400 | 48 | 0.80 |
| Do | 535 g. attapulgite clay | 5 | 1,200 | 24 | 0.045 |
| Do | Same as above after 2nd acetone regeneration | 5 | 1,050 | 20.5 | 0.038 |
| Methyl cyclohexane and 2.5 wgt. percent phenol | 60 g. Nopco polyurethane (ether type) regenerated by acetone. | 10 | 2,700 | 54 | 0.90 |

*Both polyurethane foams are of the open-celled type.

In every case, after breakthrough occurred, vacuum was applied at the bottom of the column to remove the bulk of the entrained solution and the adsorbed phenolic was removed by allowing acetone to flow thru the column. The acetone effluent contained the adsorbed phenol. After air-drying to remove the excess acetone, the column was ready for reuse.

We claim:

1. In the purification and recovery of phenolic material from hydrocarbon solutions, the steps which comprise contacting a solution of the phenolic material in a hydrocarbon solvent with polyurethane foam at a temperature in the range of about 0°–200° F. for a substantial length of time to adsorb a substantial portion of the phenolic material contained in the solution and separating the resulting liquid from the foam.

2. The process as defined in claim 1 conducted at a temperature in the range of 0° to 200° F.

3. The process as defined in claim 1 wherein said steps are carried out at a temperature in the range of about 20° to 30° C.

4. The method as defined in claim 1 wherein the polyurethane foam is in the form of particles in the neighborhood of about 10 mesh.

5. The method according to claim 1 wherein said polyurethane foam is of the ester type.

6. The method according to claim 1 wherein the polyurethane foam is of ether type.

7. The method according to claim 1 wherein the polyurethane foam is of the open-celled or reticulate type.

8. The method according to claim 1 wherein the polyurethane foam containing adsorbed phenolics is regenerated by contacting with acetone.

* * * * *